(12) United States Patent
Huang et al.

(10) Patent No.: US 11,960,535 B2
(45) Date of Patent: Apr. 16, 2024

(54) METHOD FOR RECOMMENDING PODCAST IN MUSIC APPLICATION AND DEVICE

(71) Applicant: BEIJING BYTEDANCE NETWORK TECHNOLOGY CO., LTD., Beijing (CN)

(72) Inventors: Haiyang Huang, Beijing (CN); Jiarui Xu, Beijing (CN); Yang Li, Beijing (CN); Weihao Wang, Beijing (CN); Yiming Xiong, Beijing (CN); Yuxin Yang, Beijing (CN)

(73) Assignee: BEIJING BYTEDANCE NETWORK TECHNOLOGY CO., LTD. (CN)

( * ) Notice: Subject to any disclaimer, the term of this patent is extended or adjusted under 35 U.S.C. 154(b) by 51 days.

(21) Appl. No.: 17/601,066

(22) PCT Filed: Jul. 2, 2021

(86) PCT No.: PCT/CN2021/104354
§ 371 (c)(1),
(2) Date: Oct. 3, 2021

(87) PCT Pub. No.: WO2022/160605
PCT Pub. Date: Aug. 4, 2022

(65) Prior Publication Data
US 2023/0108731 A1    Apr. 6, 2023

(30) Foreign Application Priority Data
Jan. 30, 2021    (CN) .......................... 202110131503.2

(51) Int. Cl.
*G06F 16/63*    (2019.01)
*G06F 3/0482*    (2013.01)
(Continued)

(52) U.S. Cl.
CPC .......... *G06F 16/638* (2019.01); *G06F 3/0482* (2013.01); *G06F 3/04847* (2013.01); *G06F 3/165* (2013.01); *G06F 16/635* (2019.01)

(58) Field of Classification Search
CPC .. G06F 16/638; G06F 3/0482; G06F 3/04847; G06F 3/165; G06F 16/635;
(Continued)

(56) References Cited

U.S. PATENT DOCUMENTS

| | | | | |
|---|---|---|---|---|
| 11,609,738 | B1 * | 3/2023 | Imbruce | ................ G06F 16/638 |
| 2006/0265637 | A1 | 11/2006 | Marriott et al. | |
| 2020/0007917 | A1 * | 1/2020 | Schneck | .......... H04N 21/25891 |

FOREIGN PATENT DOCUMENTS

| | | |
|---|---|---|
| CN | 106202103 A | 12/2016 |
| CN | 106302678 A | 1/2017 |
| CN | 112948621 A | 6/2021 |

OTHER PUBLICATIONS

International Patent Application No. PCT/CN2021/104354, International Search Report dated Oct. 26, 2021, 12 pages.

* cited by examiner

*Primary Examiner* — Etienne P Leroux
*Assistant Examiner* — Cindy Nguyen

(57) ABSTRACT

Embodiments of the present disclosure provide a method for recommending a podcast in music application and a device, where the method includes: a terminal device receives a start instruction for a podcast interface the music application; and the terminal device displays a first preset number of recommended podcast programs in the podcast interface in response to the start instruction, where each of the recommended podcast programs is an episode of audio data, and the recommended podcast programs include a podcast program matching with a preference of a user who uses the music application.

11 Claims, 6 Drawing Sheets

(51) Int. Cl.
 *G06F 3/04847* (2022.01)
 *G06F 3/16* (2006.01)
 *G06F 16/635* (2019.01)
 *G06F 16/638* (2019.01)

(58) Field of Classification Search
 CPC .......... G06F 16/9535; H04N 21/25891; H04N 21/4668; H04N 21/4825; H04N 21/4826
 See application file for complete search history.

METHOD FOR RECOMMENDING PODCAST IN MUSIC APPLICATION AND DEVICE

CROSS-REFERENCE TO RELATED APPLICATIONS

This application is a national stage of International Application No. PCT/CN2021/104354, filed on Jul. 2, 2021, which claims priority to Chinese Patent Application No. 202110131503.2, filed to the China National Intellectual Property Administration on Jan. 30, 2021, and entitled "Method for Recommending Podcast in Music Application and Device". Both of the aforementioned patent applications are hereby incorporated by reference in their entireties.

TECHNICAL FIELD

Embodiments of the present disclosure relate to the technical field of personalized recommendation and, in particular, to a method for recommending a podcast in a music application and a device.

BACKGROUND

With functions of terminal devices become stronger and stronger, people are using terminal devices more and more widely. Most of people's use of the terminal devices is use of applications running in the terminal devices. Different applications provide different functions. For example, a music application can provide a user with functions of music search and music playing.

In the prior art, when using the music application, a user can search not only music, but also a podcast program. After the user inputs information of the podcast program in the music application, corresponding podcast programs will be displayed in the music application. Thereafter, the user can click on one target podcast program among them to play.

However, the above solution has a problem of high complexity in playing the podcast program. In addition, if the user does not know the information of the podcast program, the podcast program cannot be played.

SUMMARY

Embodiments of the present disclosure provide a method for recommending a podcast in a music application and a device, so as to solve the existing problems that playing a podcast program is high in complexity and the playing of the podcast program cannot be achieved.

In a first aspect, an embodiment of the present disclosure provides a method for recommending a podcast in a music application, which is applied to a terminal device and includes:

receiving a start instruction for a podcast interface in the music application; and displaying, in response to the start instruction, a first preset number of recommended podcast programs in the podcast interface, where each of the recommended podcast programs is an episode of audio data, and the recommended podcast programs include a podcast program matching with a preference of a user who uses the music application.

In a second aspect, an embodiment of the present disclosure provides a method for recommending a podcast in a music application, which is applied to a server and includes:

receiving a podcast recommendation request;

acquiring podcast programs matching with preference information of a user as recommended podcast programs when the podcast recommendation request includes the preference information of the user; and taking podcast programs related to a first podcast program as the recommended podcast programs when the podcast recommendation request includes an identification of a user and there is the first podcast program historically operated by the user corresponding to the identification of the user.

In a third aspect, an embodiment of the present disclosure provides a terminal device, including:

a start instruction receiving module, configured to receive a start instruction for a podcast interface in a music application; and a recommended podcast display module, configured to display a first preset number of recommended podcast programs in the podcast interface in response to the start instruction, where each of the recommended podcast programs is an episode of audio data, and the recommended podcast programs include a podcast program matching with a preference of a user who uses the music application.

In a fourth aspect, an embodiment of the present disclosure provides a server, including:

a podcast recommendation request receiving module, configured to receive a podcast recommendation request;

a first recommended podcast determination module, configured to acquire podcast programs matching with preference information of a user as recommended podcast programs when the podcast recommendation request includes the preference information of the user; and a second recommended podcast determination module, configured to take podcast programs related to a first podcast program as the recommended podcast programs when the podcast recommendation request includes an identification of the user and there is the first podcast program historically operated by the user corresponding to the identification of the user.

In a fifth aspect, an embodiment of the present disclosure provides a terminal device including: at least one processor and a memory;

where the memory stores computer executable instructions; and the at least one processor executes the computer executable instructions stored in the memory to cause the terminal device to implement the method according to the first aspect above.

In a sixth aspect, an embodiment of the present disclosure provides a server including: at least one processor and a memory;

where the memory stores computer executable instructions; and the at least one processor executes the computer executable instructions stored in the memory to cause the server to implement the method according to the second aspect above.

In a seventh aspect, an embodiment of the present disclosure provides a system for recommending a podcast in a music application, including: the terminal device according to the third aspect or the fifth aspect and the server according to the fourth aspect or the sixth aspect.

In an eighth aspect, an embodiment of the present disclosure provides a computer readable storage medium, where the computer readable storage medium stores computer executable instructions that, when executed by a processor, causes a computing device to implement the method according to the first aspect or the second aspect.

In a ninth aspect, an embodiment of the present disclosure provides a computer program, where the computer program is used for implementing the method according to the first aspect or the second aspect.

In a tenth aspect, an embodiment of the present disclosure provides a computer program product, where the computer program product includes: a computer program, when executed by a processor, is used for implementing the method as described in the first aspect or the second aspect above.

This embodiment provide the method for recommending a podcast in a music application and the device, where the method includes: a terminal device receives a start instruction for a podcast interface the music application; and the terminal device displays a first preset number of recommended podcast programs in the podcast interface in response to the start instruction, where each of the recommended podcast programs is an episode of audio data, and the recommended podcast programs include a podcast program matching with a preference of a user who uses the music application. The embodiments of the present disclosure can actively display a number of podcast programs to a user in a music application for the user to select a target podcast program to be played, thereby avoiding the user from inputting information of the podcast program, reducing operation steps of the user, reducing complexity of playing the podcast program, and achieving playing of the podcast program under the condition that the user does not know information of the podcast program.

BRIEF DESCRIPTION OF DRAWINGS

In order to explain the embodiments of the present disclosure or the technical solutions in the prior art more clearly, the drawings that need to be used in the description of the embodiments or the prior art will be briefly introduced in the following. Obviously, the drawings in the following description are some embodiments of the present disclosure, and for those of ordinary skilled in the art, other drawings can be obtained according to these drawings without paying creative effort.

DESCRIPTION OF EMBODIMENTS

In order to make the objections, technical solutions and advantages of the embodiments of the present disclosure clearer, the technical solutions in the embodiments of the present disclosure will be described clearly and comprehensively with reference to the drawings in the embodiments of the present disclosure. Obviously, the described embodiments are part of the embodiments of the present disclosure, rather than all of them. Based on the embodiments in the present disclosure, all other embodiments obtained by those of ordinary skilled in the art without creative effort belong to the protection scope of the present disclosure.

Embodiments of the present disclosure can be applied to podcast playing scenarios in a music application. A music application can usually provide users with functions of music searching, music recommendation and music playing. With the popularization of music applications, music applications can also provide users with other audio programs, such as podcasts, radio stations, cross talk and so on. Where the podcast is a network audio program pre-recorded by a provider, and the network audio program is uploaded to a server of a music application by the provider, so that users can obtain and play it from the server through the music application. In practical application, each provider can provide multiple genres of podcasts. In the embodiments of the present disclosure, one genre of podcast can be called a genre of show (sound program), each genre of the podcasts includes multiple podcast programs, each of the podcast programs corresponds to one theme, each of the podcast programs can be an episode of audio data, and the episode of audio data corresponds to an audio file.

Figure 1:
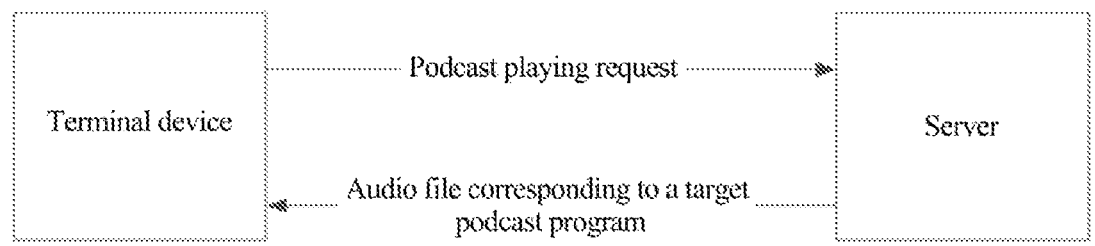
FIG. 1 exemplarily shows a podcast playing scenario based on a terminal device and a server provided by an embodiment of the present disclosure.

The above music application may be a client running in a terminal device, and may also be called a music application or a music client. As shown in FIG. 1, a podcast playing scenario based on a terminal device and a server provided by an embodiment of the present disclosure is shown exemplarily. After a user selects a target podcast program in the music application of the terminal device, at first, the terminal device sends a podcast playing request to a server, and the podcast playing request can carry an identification of the target podcast program; then, after receiving the podcast playing request, the server acquires audio data corresponding to the target podcast program according to the identification of the target podcast program in the podcast playing request, and sends the audio data to the terminal device; at the last, the terminal device plays the audio data corresponding to the received target podcast program.

In the above podcast playing scenario, the target podcast program selected by the user may be one of the podcast programs obtained by the user through searching. Specifically, after the user inputs information of the podcast program in the music application, the corresponding podcast program will be displayed in the music application. Thereafter, the user can click on one target podcast program among them to play.

However, the above solution requires the user to input the identification of the podcast program, which increases the user operation steps, resulting in high complexity of playing the podcast program. In addition, if the user doesn't know the information of the podcast program, the user can't search the podcast program in a music application, therefore, the music application can't provide the user with optional podcast programs, resulting in the inability to achieve the playing of the podcast program.

In order to solve the above technical problems, a number of podcast programs can be actively displayed to the user in the music application for the user to select a target podcast program to be played, thereby avoiding the user from inputting information of the podcast program, reducing operation steps of the user, reducing the complexity of playing the podcast program, and achieving the playing of the podcast program under the condition that the user does not know the information of the podcast program.

The technical solutions of the embodiments of the present disclosure and how the technical solutions of the present disclosure solve the above technical problems will be described in detail with specific embodiments below. The following specific embodiments can be combined with each other, and the same or similar concepts or processes may not be repeated in some embodiments. The embodiments of the present disclosure will be described below with reference to the drawings.

Figure 2:
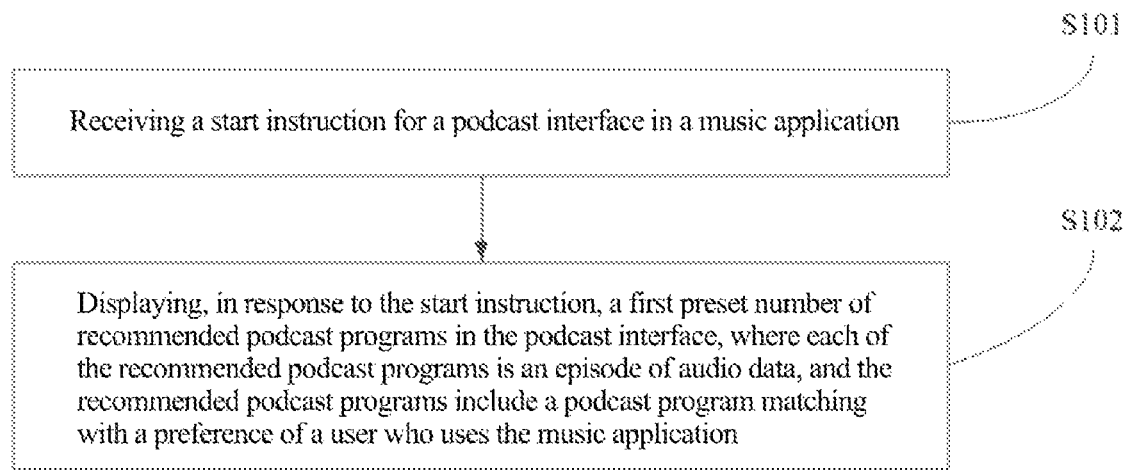
FIG. 2 exemplarily shows a step flow chart of a method for recommending a podcast in a music application provided by an embodiment of the present disclosure.

Referring to FIG. 2, FIG. 2 exemplarily shows a step flow chart of a method for recommending a podcast in a music application provided by an embodiment of the present disclosure. The method shown in FIG. 2 can be applied to a terminal device, and the terminal device executes the steps of the method which include:

S101: receiving a start instruction for a podcast interface in a music application.

Where the podcast interface is used to display information related to podcasts, which includes but not limited to: a podcast which is stopped to be played by the user, podcast programs matching with the preferences of the users recommended to the users, newly launched podcast programs, podcasts having been played by the user, and podcast programs downloaded locally by the user.

The above podcast interface usually corresponds to a target control for starting the podcast interface in a head interface of the music application. After the user operates the target control, the podcast interface is displayed in the music application and the podcast program is displayed in the podcast interface. Therefore, the above receiving the start instruction for the podcast interface in the music application includes: receiving an operation instruction for a target control in a navigation bar of the music application, where the target control is used to start the podcast interface.

Where the navigation bar is located at a top, bottom or side area of any interface of the music application. The navigation bar usually includes a plurality of controls for starting different interfaces, and the navigation bar is always displayed when the user switches different interfaces. The target control located in the navigation bar can facilitate the user to start a corresponding interface.

The target control may be any control in the navigation bar. For example, when the above podcast interface can be a tab (tabulator) page, the target control can be a Tab tab.

Figure 3:
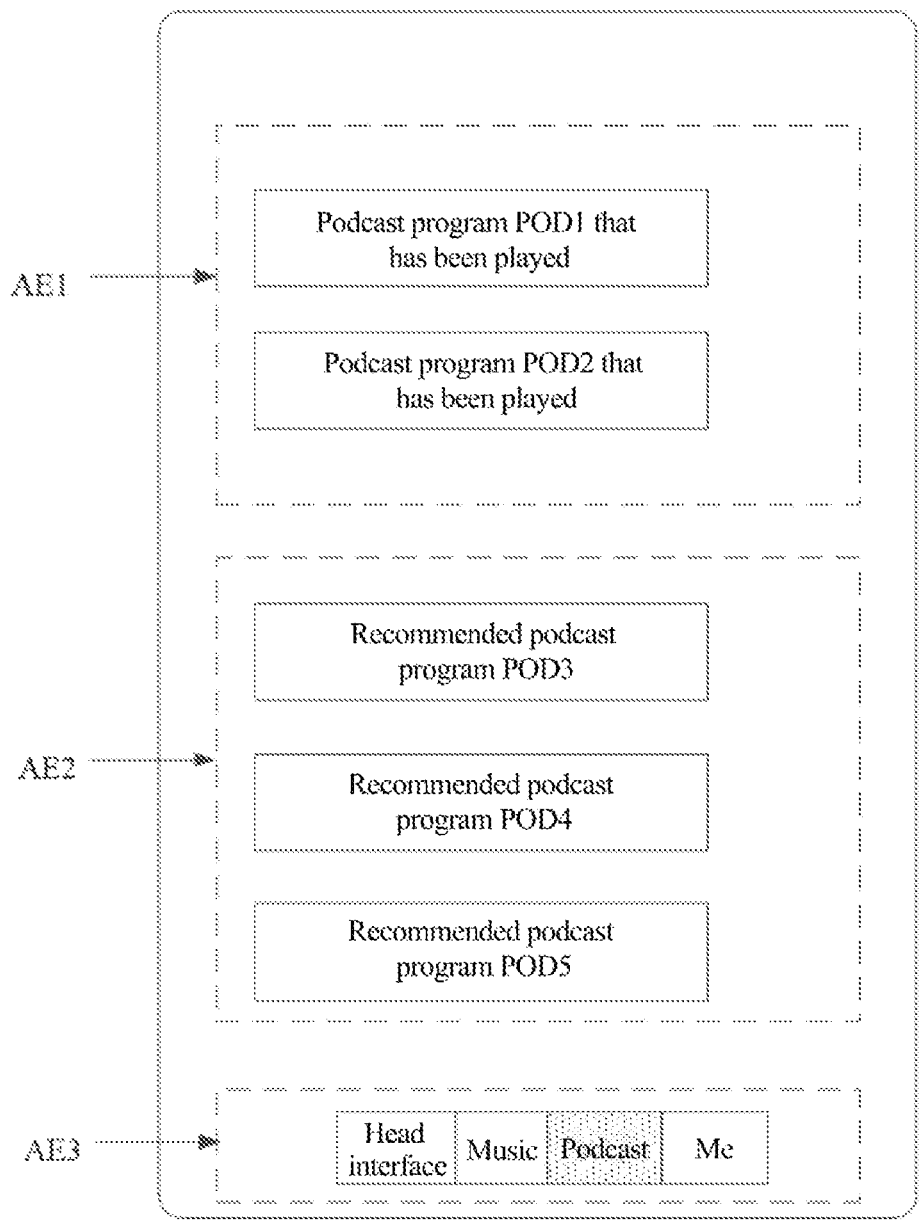
FIG. 3 exemplarily shows a schematic diagram of an interface of a music application provided by an embodiment of the present disclosure.

FIG. 3 exemplarily shows a schematic diagram of an interface of a music application provided by an embodiment of the present disclosure. As shown in FIG. 3, the navigation bar is located in the bottom area AE3, and there are many controls displayed in AE3: a "Head interface" control, a "Music" control, a "Podcast" control and a "Me" control. Among them, the "Head interface" control can be used for starting the head interface, the "Music" control is used for starting the interface for displaying music, the "Podcast" control is used for starting the podcast interface, and the "Me" control is used for starting the interface for displaying information of the user.

S102: displaying, in response to the start instruction, a first preset number of recommended podcast programs in the podcast interface, where each of the recommended podcast programs is an episode of audio data, and the recommended podcast programs include a podcast program matching with a preference of a user who uses the music application.

Where the recommended podcast programs are podcast programs recommended to the user. It can be understood that displaying the recommended podcast programs can be displaying basic information of the recommended podcast programs, where basic information includes at least one of the following items: cover information, title, description information, and duration.

The above recommended podcast programs are determined according to the preference of the user. The preference of the user can be determined by the entered preference information of the user or determined by a first podcast program historically operated by the user, so that the recommended podcast programs include at least one of the following: podcast programs matching with logged preference information of the user and the podcast programs related to the first podcast program, where the first podcast program is generated according to an historical operation of the user.

The above preference information of the user may include, but is not limited to: one or more genres of podcasts preferred by the user, podcast providers preferred by the user, podcast types preferred by the user, podcast themes preferred by the user, and a podcast duration preferred by the user and so on.

In an embodiment, based on the preference information of the user above, before displaying the first preset number of recommended podcast programs in the podcast interface, the method further includes: acquiring, according to the preference information of the user, the recommended podcast programs, if a number of times that the podcast interface is started is less than or equal to a preset number.

Where the preset number of times is set in advance, and when the number of times that the user starts the podcast interface in the terminal device is less than or equal to the preset number of times, the user is considered as a new user. For the new user, since the new user has never or less searched or played podcast programs, it is impossible to accurately determine the recommend podcast programs according to the first podcast program historically operated by the user. In order to achieve personalized podcast recommendation for the new user, the recommended podcast programs can be determined according to the logged preference information of the user.

Specifically, at first, the terminal device can generate a podcast recommendation request and send it to the server, where the podcast recommendation request includes the preference information of the user; then, after receiving the podcast recommendation request, the server acquires the podcast programs matching with the preference information of the user as the recommended podcast programs and sends the recommended podcast programs to the terminal device; at the last, after receiving the recommended podcast programs, the terminal device displays the recommended podcast programs in the above podcast interface.

In an embodiment, before acquiring the recommended podcast programs according to the preference information of the user, the method further includes: displaying a preference logging interface; and receiving the preference information of the user inputted by the user in the preference logging interface;

Where the preference logging interface is used for receiving the preference information of the user inputted by the user.

Specifically, the displaying of the preference logging interface may mainly include two strategies. In a first strategy, the preference logging interface is displayed as a sub-interface in the above podcast interface after the podcast interface is started for the first time or the previous several times; in a second strategy, the first prompt information can be displayed first;

and the preference logging interface is displayed in response to a confirmation instruction of the user for the first prompt information;

Where the first prompt information is used for prompting the user whether to enter the preference logging interface, and the preference information of the user can be collected with full consideration of the user's wishes.

The above first prompt information can be displayed at the top in the manner of a streamer, or displayed at any position in the podcast interface in the manner of information flow. The manner of information flow does not affect the rest operations of the user, and the user can directly operate the rest controls without operating the information flow.

It should be noted that before displaying the preference logging interface, it can also be determined whether the preference information of the user is stored in the terminal device. If the answer is yes, the preference logging interface and the first prompt information are not displayed; and if the answer is no, the preference logging interface is displayed by the first strategy above, or the first prompt information and the preference logging interface are displayed by the second strategy.

The above process describes in detail a process of the podcast recommendation for the new user by using the preference information of the user, and a process of the podcast recommendation for an old user by using the first podcast program will be described in detailed below.

In an embodiment, before the displaying a first preset number of recommended podcast programs in the podcast interface, the method further including: acquiring, according to a user identification of the user, the recommended podcast programs, if the number of times that the podcast interface is started is greater than the preset number of times and a duration between a current time and a last update time is greater than or equal to a first preset duration, where the last update time is a time when the recommended podcast programs are acquired last time; and acquiring recommended podcast programs acquired last time from the terminal device, if the number of times that the podcast interface is started is greater than the preset number of times and the duration between the current time and the last update time is less than the first preset time.

It can be understood that when the number of times that the user starts the podcast interface in the terminal device is greater than the preset number of times, the user is considered as the old user. For the old user, since the old user has searched and played podcast programs, it is possible to accurately determine the recommend podcast programs according to the first podcast program historically operated by the user. Specifically, at first, the terminal device sends the podcast recommendation request to the user, where the podcast recommendation request may carry the identification of the user; then, after receiving the podcast recommendation request, the server acquires podcast programs corresponding to the identification of the user from historical behavior record as a first podcast program historically operated by the user, and determines podcast programs related to the first podcast program as the recommended podcast programs; at the last, the server sends the recommended podcast programs to the terminal device, and after receiving the recommended podcast programs, the terminal device displays the recommended podcast programs in the above podcast interface.

In the embodiments of the present disclosure, in order to reduce the delay of displaying of the above podcast interface, a frequency of acquiring the recommended podcast programs may be reduced. Specifically, for the old users, instead of acquiring the recommended podcast programs every time that the above podcast interface is started, the recommended podcast programs are acquired at least once every interval of the first preset duration. The terminal device can save the recommended podcast programs locally after acquiring the recommended podcast programs every time, so as to display the recommended podcast programs acquired from the server last time when the interval is less than the first preset time. When the recommended podcast programs are acquired again, the locally saved recommended podcast programs are updated to be re-acquired recommended podcast programs.

In an embodiment, the above recommended podcast programs include at least one of following: podcast programs that are not displayed in the podcast interface in a first current time period and podcast programs that are not finished to be played in a second current time period, where a duration of the above first current time period is shorter than a duration of the second current time period.

Where the first current time period and the second current time period are time periods whose end times are the current times and whose duration is fixed correspondingly. For example, the first current time period may be the last three days, and the second current time period may be the last three months. Podcast programs which are not displayed in the podcast interface in the first current time period include but are not limited to: recommended podcast programs which are not displayed in the first current time period and podcast programs which are not played in the first current time period. The embodiments of the present disclosure can avoid repeatedly recommending podcast programs to the user in the first current time period, and can also avoid recommending podcast programs recently viewed by the user to the user in the second current time period.

It can be understood that after receiving the recommended podcast programs sent by the server, the terminal device can first delete a podcast program displayed in the podcast interface in the first current time period from the recommended podcast programs, and a podcast program that is finished to be played in the second current time period; and then display remaining recommended podcast programs in the above podcast interface.

In an embodiment, if a number of the remaining recommended podcast programs is less than or equal to the first preset number, the recommended podcast programs and the corresponding display area of the recommended podcast programs may not be displayed.

In an embodiment, after the recommended podcast programs are displayed in the above podcast interface, the user can operate the recommended podcast programs. When the user carries out a first operation instruction, the terminal device can receive the first operation instruction of the user for an episode of target podcast program; and play the target podcast program in response to the first operation instruction. When the user carries out a second operation instruction, the terminal device can receive the second operation instruction of the user for an episode of target podcast program; and display detailed information of the target podcast program in response to the second operation instruction.

Where the target podcast program is any one of the recommended podcast programs, and the first operation instruction and the second operation instruction are operation instructions for different areas and/or different types. For example, the first operation instruction may be a click operation for a playing button on the target podcast program, and the second operation instruction may be a click operation for a display area of the target podcast program.

The detailed information of the above target podcast program may include, but is not limited to: a provider of the podcast, release time, etc.

In the embodiments of the present disclosure, the above podcast interface can display not only the recommended podcast programs, but also a podcast program that is stopped to be played. In an embodiment, the above method further includes:

displaying, in response to the start instruction, basic information of a podcast program that has been played by the user is displayed in the podcast interface, where the above basic information includes at least one of the following items: cover information, title, description information, and duration.

Where the podcast program that has been played can include, but is not limited to: a podcast program that has been played in whole or in part. It can be understood that the podcast program that has been played has been stopped at the current time.

As shown in FIG. 3, the user clicks the "Podcast" control, so that the podcast interface is displayed on the music application. The above podcast interface includes two sub-areas AE1 and AE2 arranged up and down, in which the podcast programs POD1 and PGD2 that have been played are displayed in AE1, and the recommended podcast programs POD3, POD4 and POD5 are displayed in AE2.

It can be understood that the user can also operate the podcast program that has been played. When the user carries out a third operation instruction, the terminal device can receive the third operation instruction of the user for an episode of the podcast program that has been played; and play, in response to the third operation instruction, the podcast program that has been played. When the user carries out a fourth operation instruction, the terminal device can receive the fourth operation instruction of the user for an episode of the podcast program that has been played; and display, in response to the fourth operation instruction, detailed information of the podcast program that is stopped to be played.

The third operation instruction and the fourth operation instruction are operation instructions for different areas and/or different types. For example, the third operation instruction may be a click operation for a playing button on the podcast program that is stopped to be played, and the fourth operation instruction may be a click operation for a display area of the podcast program that is stopped to be played.

Figure 4:
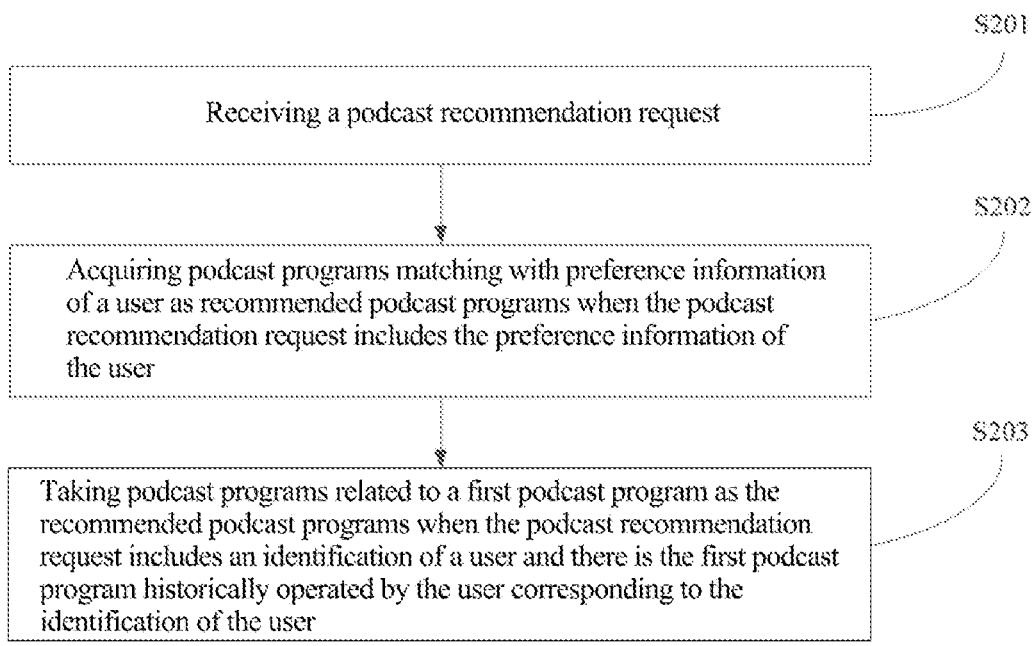
FIG. 4 exemplarily shows a step flow chart of a method for recommending a podcast in a music application provided by an embodiment of the present disclosure.

Referring to FIG. 4, FIG. 4 exemplarily shows a step flow chart of a method for recommending a podcast in a music application provided by an embodiment of the present disclosure. The method shown in FIG. 4 can be applied to a server, and the server executes the steps of the method. The method includes:

S201: receiving a podcast recommendation request.

Where the podcast recommendation request is sent by the terminal device to the server, and the podcast recommendation request may include, but is not limited to: the preference information of the user or the identification of the user.

S202: acquiring podcast programs matching with preference information of a user as recommended podcast programs when the podcast recommendation request includes the preference information of the user.

Specifically, after receiving the podcast recommendation request, the server acquires, from a podcast program database, the podcast programs matching with the preference information of the user and sends the podcast programs to the terminal device.

S203: taking podcast programs related to a first podcast program as the recommended podcast programs when the podcast recommendation request includes an identification of a user and there is the first podcast program historically operated by the user corresponding to the identification of the user.

Specifically, after receiving the podcast recommendation request, the server acquires, from the podcast program database, recommended podcast programs related to the first podcast program and sends the recommended podcast programs to the terminal device.

The recommended podcast programs related to the first podcast program may include, but are not limited to: podcast programs belonging to the same genre as the first podcast program, podcast programs belonging to the same type as the first podcast program, podcast programs belonging to the same theme as the first podcast program, podcast programs including the same content as the first podcast program, and podcast programs of other podcasts related to podcasts to which the first podcast program belongs.

It can be understood that the above different recommended podcast programs can have priorities, for example, the podcast programs belonging to the same genre as the first podcast program are preferentially selected as the recommended podcast programs, and then the podcast programs belonging to the same type as the first podcast program are taken as recommended podcast programs, etc.

In an embodiment, the above method further includes:

acquiring, according a preset parameter, the recommended podcast programs when the podcast recommendation request includes the identification of the user and there is no the first podcast program historically operated by the user corresponding to the identification of the user, where the above preset parameter includes at least one of the following: historical recommendation frequency and historical searching frequency.

Where frequency can include frequency and times, and the frequency can be times per unit time.

The embodiments of the present disclosure can take podcast programs with higher historical recommendation frequency or higher historical searching frequency as the recommended podcast programs. Since the preset parameter are obtained by the server according to the historical behavior record of podcasts, and are not distinguished between users, that is to say, the preset parameter is the same for different users, so that the recommended podcast programs are the same for different users.

When the first podcast program may not exist in the embodiments of the present disclosure, the podcast programs is recommend to the user according to the preset parameter, thereby ensuring recommendation coverage area of podcast programs.

In an embodiment, the above recommended podcast programs meet at least one of the following conditions: the recommended podcast programs meet compliance conditions, durations of the recommended podcast programs are greater than or equal to a second preset time, that basic information of the recommended podcast programs is not empty, a number of recommended podcast programs belonging to a same genre is less than or equal to a second preset number, the number of recommended podcast programs belonging to the same category in a third current time period is less than or equal to the second preset number, and the recommended podcast programs are podcast programs that are not recommended in a fourth current time period, where basic information of the recommended podcast programs includes: cover information, title, description information, and duration.

Where the compliance conditions can be the limited conditions of the podcast program in a designated area, which is used for limiting the types, contents and providers of the podcast programs. The embodiments of the present disclosure can avoid recommending podcast programs that do not meet the limited conditions of designated areas to the users.

The second preset duration is the shortest duration of the recommended podcast program, and the embodiments of the present disclosure can avoid recommending too short podcast programs to the users.

The basic information is used for being displayed when the recommended podcast programs are displayed to assist the user in making a choice from the recommended podcast programs. The embodiments of the present disclosure can avoid recommending podcast programs with empty basic information to the users, as such, the users can learn about recommended podcast programs according to the basic information, and then select the target podcast program to play, which is conducive to improve an access rate of recommended podcast programs.

The number of recommended podcast programs belonging to the same genre of podcasts is less than or equal to the second preset number, which can ensure the diversity of podcasts to which the recommended podcast programs belong.

The third current time period is the period whose end time is the current time and whose duration is fixed. That the number of recommended podcast programs belonging to the same genre of podcasts in the third current time period is less than or equal to the second preset number, which can ensure the diversity of podcasts to which the recommended podcast programs in the third current time period belong.

And podcast programs that are not recommended in the fourth current time period include: recommended podcast programs sent by the server to the terminal device in the fourth current time period, which can avoid repeatedly recommending podcast programs to users in the fourth current time period.

In an example, the server can determine whether a podcast program meets the above conditions for one of the podcast programs in the podcast program database when acquiring the recommended podcast programs; and determine, if the above conditions are met, whether the podcast programs is the recommended podcast program according to S202 or S203; and determine, if the above conditions are not met, that the podcast program is not the recommended podcast program.

In another example, when acquiring the recommended podcast programs, the server may further first determine the recommended podcast programs according to S202 or S203, and then delete a podcast program that does not meet the above conditions from the recommended podcast programs determined in S202 or S203 to send the remaining recommended podcast programs to the terminal device.

In combination with the method for recommending a podcast in a music application shown in FIG. 2 and FIG. 4, FIG. 5 and FIG. 6 exemplarily shows schematic diagrams of two interaction processes between a terminal device and a server provided by an embodiment of the present disclosure.

Figure 5:
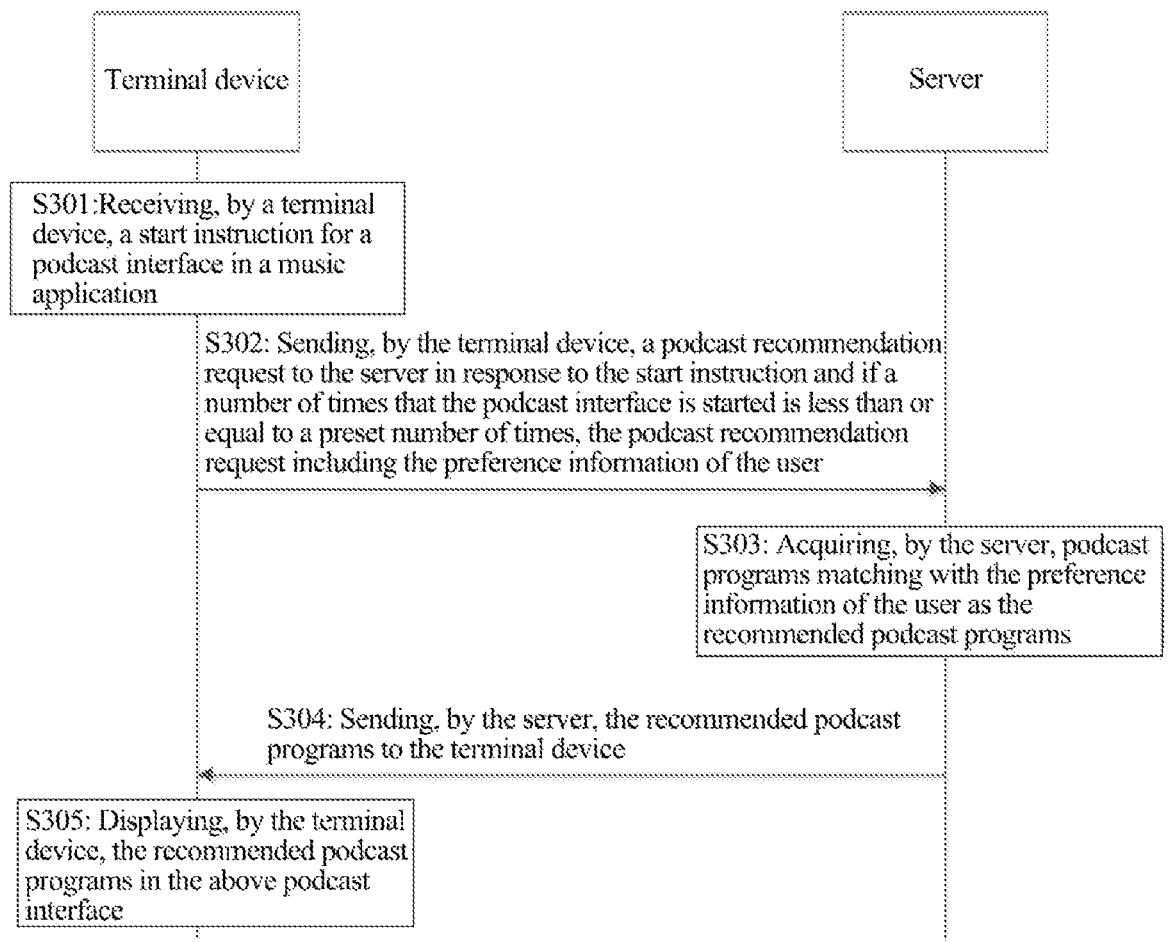
FIG. 5 and FIG. 6 exemplarily show schematic diagrams of two interaction processes between a terminal device and a server provided by an embodiment of the present disclosure.

In FIG. 5, the interaction process between the terminal device and the server includes:

S301: receiving, by a terminal device, a start instruction for a podcast interface in a music application.

S302: sending, by the terminal device, a podcast recommendation request to the server in response to the start instruction and if a number of times that the podcast interface is started is less than or equal to a preset number of times, the podcast recommendation request including the preference information of the user.

Accordingly, the server receives the podcast recommendation request sent by the terminal device.

S303: acquiring, by the server, podcast programs matching with the preference information of the user as the recommended podcast programs.

S304: sending, by the server, the recommended podcast programs to the terminal device. Accordingly, the terminal device receives the recommended podcast programs sent by the server.

S305: displaying, by the terminal device, the recommended podcast programs in the above podcast interface.

Figure 6:
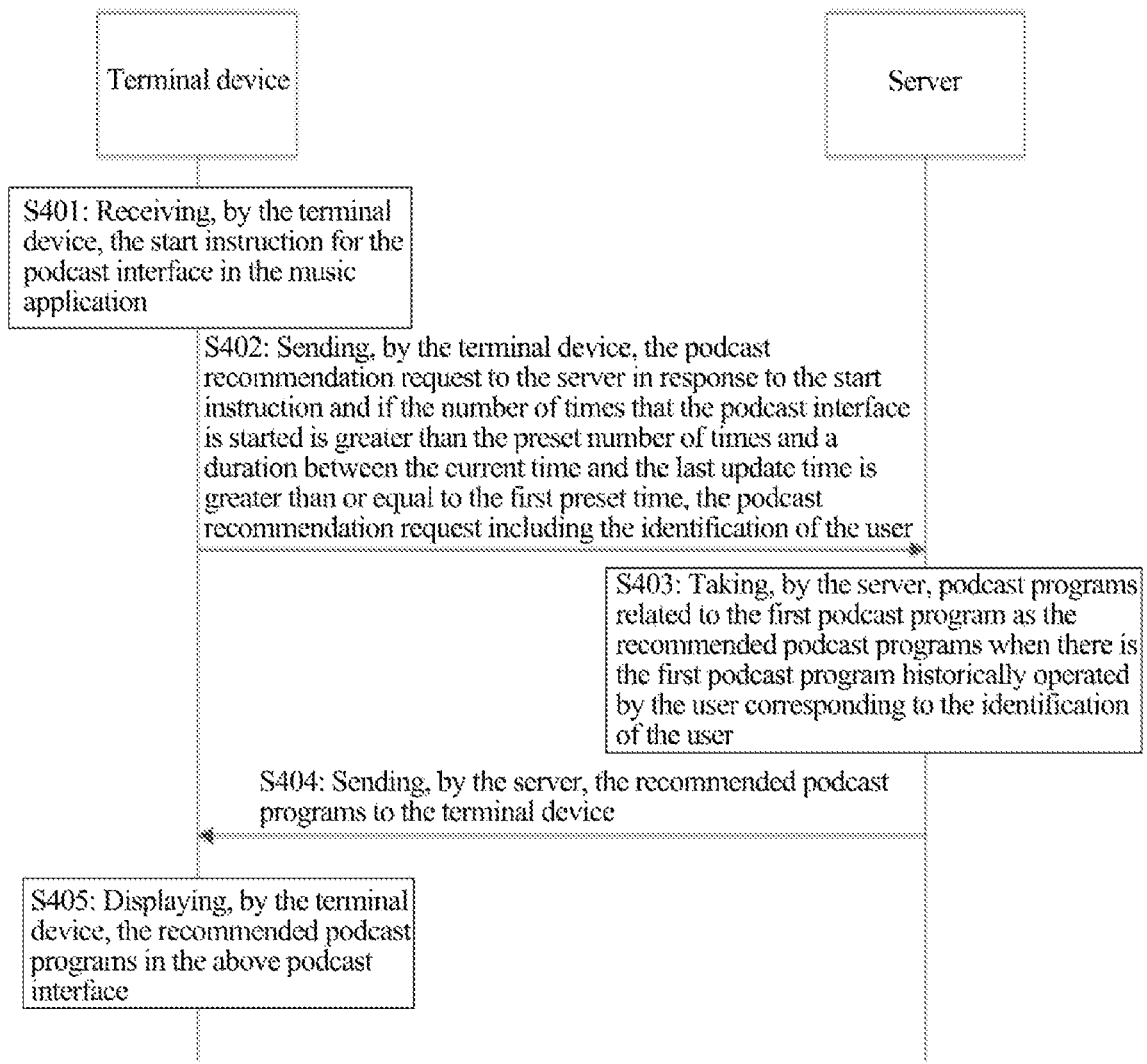

In FIG. 6, the interaction process between the terminal device and the server includes:

S401: receiving, by the terminal device, the start instruction for the podcast interface in the music application.

S402: sending, by the terminal device, the podcast recommendation request to the server in response to the start instruction and if the number of times that the podcast interface is started is greater than the preset number of times and a duration between the current time and the last update time is greater than or equal to the first preset time, the podcast recommendation request including the identification of the user.

Accordingly, the server receives the podcast recommendation request sent by the terminal device.

S403: taking, by the server, podcast programs related to the first podcast program as the recommended podcast programs when the podcast recommendation request includes an identification of the user and there is a first podcast program historically operated by the user corresponding to the identification of the user.

S404: sending, by the server, the recommended podcast programs to the terminal device.

Accordingly, the terminal device receives the recommended podcast programs sent by the server.

S405: displaying, by the terminal device, the recommended podcast programs in the above podcast interface.

The interactive process in FIG. 5 or FIG. 6 can refer to the corresponding detailed description in FIG. 2 and FIG. 4, and will not be repeated here.

Figure 7:
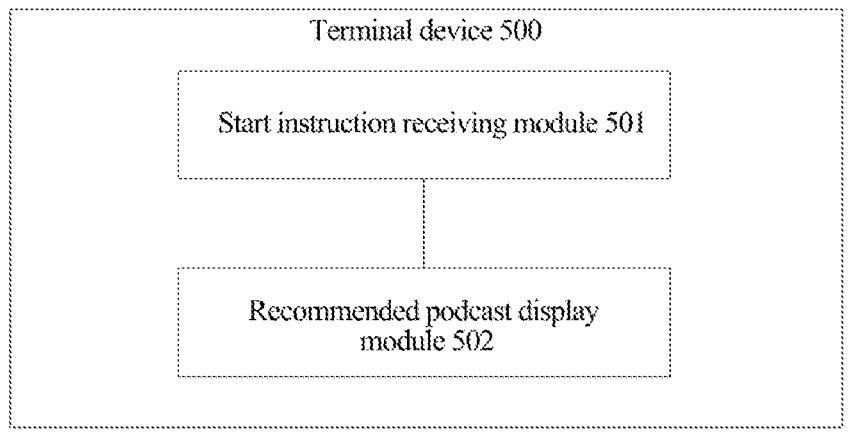
FIG. 7 exemplarily shows a structural block diagram of a terminal device provided by an embodiment of the present disclosure.

Corresponding to the method for recommending a podcast in a music application shown in FIG. 2, FIG. 7 exemplarily shows a structural block diagram of a terminal device provided by an embodiment of the present disclosure. For convenience of explanation, only parts related to the embodiments of the present disclosure are shown. Referring to FIG. 7, the above terminal device 500 includes: a start instruction receiving module 501 and a recommended podcast display module 502.

Where the start instruction receiving module 501 is configured to receive a start instruction for a podcast interface in the music application.

The recommended podcast display module 502 is configured to display a first preset number of recommended podcast programs in the podcast interface in response to the start instruction, where each of the recommended podcast programs is an episode of audio data, and the recommended podcast programs include a podcast program matching with a preference of a user who uses the music application.

In an embodiment, the podcast programs matching with the preference of the user who uses the music application include at least one of the following: podcast programs matching with logged preference information of the user and the podcast programs related to the first podcast program, where the first podcast program is generated according to an historical operation of the user.

In an embodiment, the terminal device 500 further includes:

a first recommended podcast program acquiring module, configured to acquire, according to preference information of the user, the recommended podcast programs in response to the start instruction and if a number of times that the podcast interface is started is less than or equal to a preset number.

In an embodiment, the terminal device 500 further includes:

a preference logging interface display module, configured to display the preference logging interface in response to the start instruction and if a number of times that the podcast interface is started is less than or equal to a preset number; and a user preference information receiving module, configured to receive the preference information of the user inputted by the user in the preference logging interface.

In an embodiment, the above preference logging interface display module is further configured to:

display the first prompt information in response to the start instruction and if a number of times that the podcast interface is started is less than or equal to a preset number; and display, in response to a confirmation instruction of the user for the first prompt information, the preference logging interface.

In an embodiment, the terminal device 500 further includes:

a second recommended podcast program acquiring module, configured to acquire, according to the identification of the user, the recommended podcast programs in response to the start instruction and if a number of times that the podcast interface is started is greater than the preset number of times and the duration between a current time and a last update time is greater than or equal to a first preset duration, where the above last update time is the time when the recommended podcast programs are acquired last time.

In an embodiment, the terminal device 500 further includes:

a third recommended podcast program acquiring module, configured to acquire the recommended podcast programs acquired last time from the terminal device in response to the start instruction and if the number of times that the podcast interface is started is greater than the preset number of times and the duration between the current time and the last update time is less than the first preset time.

In an embodiment, the above recommended podcast programs include at least one of the following: podcast programs that are not displayed in the podcast interface in a first current time period and podcast programs that are not finished to be played in a second current time period, where a duration of the above first current time period is shorter than a duration of the second current time period.

In an embodiment, the start instruction receiving module 501 is further configured to:

receive an operation instruction for a target control in a navigation bar of the music application, where the above target control is configured to start the podcast interface.

In an embodiment, the terminal device 500 further includes:

a first operation instruction receiving module, configured to receive the first operation instruction of the user for an episode of target podcast program; and a target podcast program playing module, configured to play the target podcast program in response to the first operation instruction.

In an embodiment, the terminal device 500 further includes:

a second operation instruction receiving module, configured to receive the second operation instruction of the user for an episode of target podcast program; and a detailed information display module, configured to display the detailed information of the target podcast program in response to the second operation instruction.

In an embodiment, the terminal device 500 further includes:

a paused program display module, configured to display basic information of the podcast program that has been played by the user is displayed in the podcast interface in response to the start instruction, where the basic information includes at least one of the following items: cover information, title, description information, and duration.

In an embodiment, the recommended podcast display module 502 is further configured to:

display basic information of a first preset number of recommended podcast programs in the podcast interface in response to the start instruction, where the basic information includes at least one of the following items: cover information, title, description information, and duration.

The terminal device provided in this embodiment can be configured to perform the technical solution of the method embodiment shown in FIG. 2, and the implementation principle and technical effect thereof are similar, which will not be repeated here in this embodiment.

Figure 8:
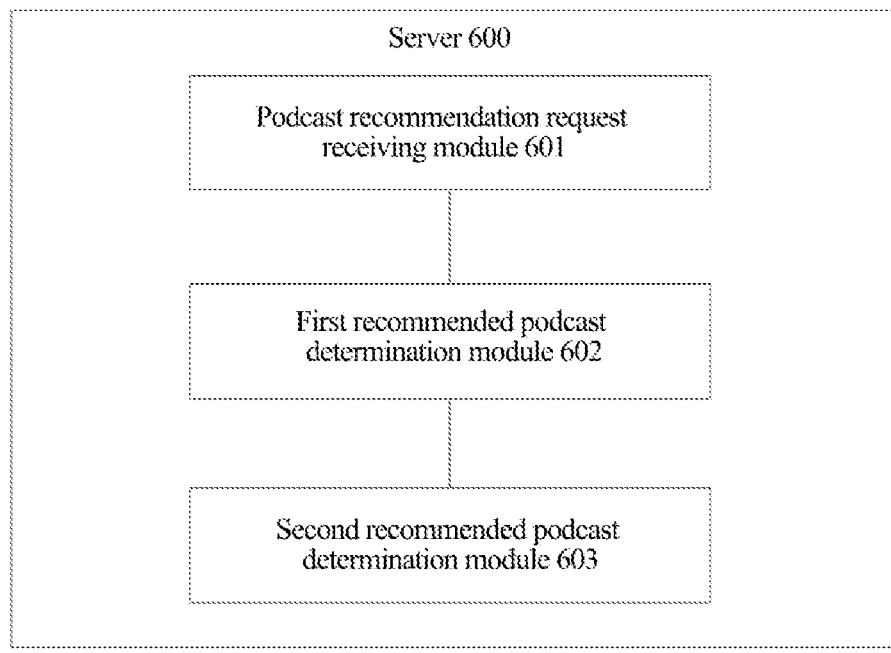
FIG. 8 exemplarily shows a structural block diagram of a server device provided by an embodiment of the present disclosure.

Corresponding to the method for recommending a podcast in a music application shown in FIG. 4, FIG. 8 exemplarily shows a structural block diagram of a server device provided by an embodiment of the present disclosure. For convenience of explanation, only parts related to the embodiment of the present disclosure are shown. Referring to FIG. 8, a server 600 includes a podcast recommendation request receiving module 601, a first recommended podcast determination module 602 and a second recommended podcast determination module 603.

Where the podcast recommendation request receiving module 601 is configured to receive the podcast recommendation request;

a first recommended podcast determination module 602 is configured to acquire podcast programs matching with preference information of a user as recommended podcast programs when the podcast recommendation request includes the preference information of the user; and a second recommended podcast determination module 603 is configured to take podcast programs related to a first podcast program as the recommended podcast programs when the podcast recommendation request includes an identification of a user and there is a first podcast program historically operated by the user corresponding to the identification of the user.

In an embodiment, the server 600 further includes:

a third recommended podcast determination module, configured to acquire, according a preset parameter, the recommended podcast programs when the podcast recommendation request includes the identification of the user and there is no the first podcast program historically operated by the user corresponding to the identification of the user, where the preset parameter includes at least one of the following: historical recommendation frequency and historical searching frequency-times.

In an embodiment, the recommended podcast programs meet at least one of the following conditions: the recommended podcast programs meet compliance conditions, durations of the recommended podcast programs are greater than or equal to a second preset time, that basic information of the recommended podcast programs is not empty, a number of recommended podcast programs belonging to a same genre is less than or equal to a second preset number, the number of recommended podcast programs belonging to the same category in a third current time period is less than or equal to the second preset number, and the recommended podcast programs are podcast programs that are not recommended in a fourth current time period, where basic information of the recommended podcast programs includes: cover information, title, description information, and duration.

The server provided in this embodiment can be configured to perform the technical solution of the method embodiment shown in FIG. 4, and the implementation principle and technical effect thereof are similar, which will not be repeated here in this embodiment.

Figure 9:
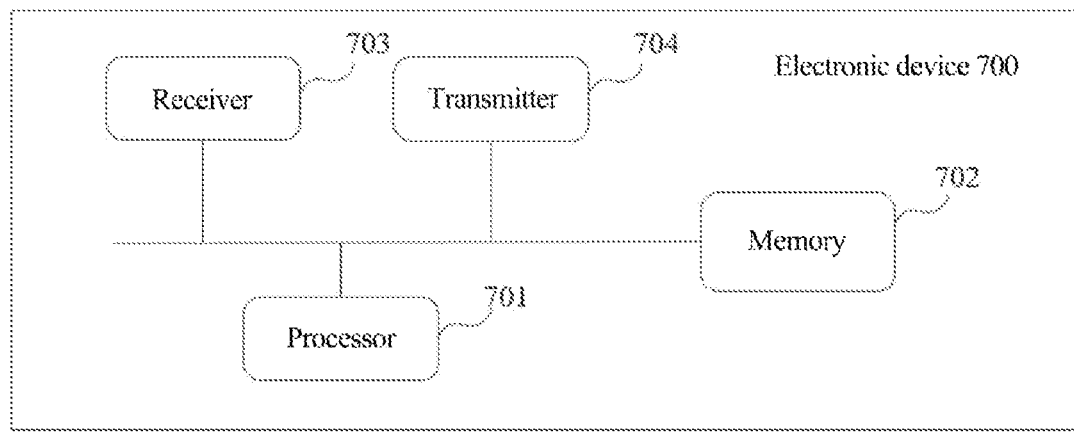
FIG. 9 exemplarily shows a structural block diagram of an electronic device provided by an embodiment of the present disclosure.

The above terminal device and server are both electronic devices, and FIG. 9 exemplarily shows a structural block diagram of an electronic device 700 provided by an embodiment of the present disclosure. The electronic device 700 includes a memory 702 and at least one processor 701.

Where the memory 702 stores computer executable instructions.

When the electronic device 700 is a terminal device, the at least one processor 701 executes the computer executable instructions stored in the memory 702 to cause the terminal device to implement the method as described above in FIG. 2.

When the electronic device 700 is a server, the at least one processor 701 executes the computer executable instructions stored in the memory 702 to cause the server to implement the method as described above in FIG. 4.

In addition, the electronic device may also include a receiver 703 and a transmitter 704, where the receiver 703 is configured to receive information from other apparatuses or devices and forward the information to the processor 701, and the transmitter 704 is configured to send the information to other apparatuses or devices.

Figure 10:
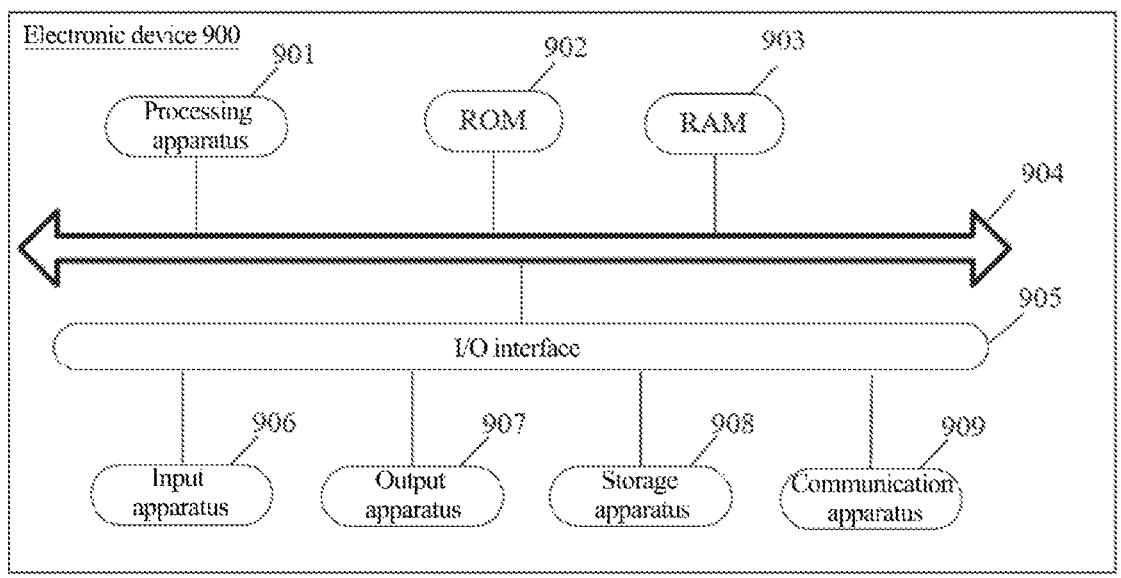
FIG. 10 exemplarily shows a schematic structural diagram of a hardware structure of an electronic device provided by an embodiment of the present disclosure.

Further, referring to FIG. 10, FIG. 10 exemplarily shows a schematic structural diagram of a hardware structure of an electronic device 900 provided by an embodiment of the present disclosure, where the electronic device 900 may be a terminal device. The terminal device may include, but is not limited to: a mobile terminal such as a mobile phone, a notebook computer, a digital broadcast receivers, a personal digital assistant (PDA for short), a portable android device (PAD for short), a portable media player (PMP for short), and an on-vehicle terminal (e.g., an on-vehicle navigation terminal), and a stationary terminal such as a digital TV (Television) and a desktop computer, etc. The electronic device shown in FIG. 10 is only an example, which should not bring any limitation to the function and the use range of the embodiments of the present disclosure.

As shown in FIG. 10, the electronic device 900 may include a processing apparatus (such as a central processor and a graphics processor, etc.) 901, which may execute various appropriate actions and processes according to programs stored in a read only memory (ROM for short) 902 or programs loaded into a random access memory (RAM for short) 903 from a storage apparatus 908. In the RAM 903, various programs and data required for the operation of the electronic device 900 are also stored. The processing apparatus 901, the ROM 902, and the RAM 903 are connected to each other through a bus 904. An input/output (I/O) interface 905 is also connected to the bus 904.

Usually, the following apparatuses can be connected to the I/O interface 905: an input apparatus 906 including, such as, a touch screen, a touchpad, a keyboard, a mouse, a camera, a microphone, an accelerometer, a gyroscope, etc.; an output apparatus 907 including, such as, a liquid crystal display (LCD for short), a speaker, a vibrator, etc.; a storage apparatus 908 including, such as, a magnetic tape, a hard disk, etc.; and a communication apparatus 909. The communication apparatus 909 may allow the electronic device 900 to perform wireless or wired communication with other devices to exchange data. Although FIG. 10 shows the electronic apparatus 900 having various apparatuses, it should be understood that it is not required to implement or have all the apparatuses shown. More or fewer apparatuses may alternatively be implemented or provided.

In particular, according to the embodiments of the present disclosure, the process described above with reference to the flow chart can be implemented as a computer software program. For example, an embodiment of the present disclosure includes a computer program product including a computer program carried on a computer readable medium, where the computer program contains program codes for executing the method shown in the flow chart.

In such embodiment, the computer program can be downloaded and installed from a network through the communication apparatus 909, or installed from the storage apparatus 908 or installed from the ROM 902. When the computer program is executed by the processing apparatus 901, the above functions defined in the methods of the embodiments of the present disclosure are executed.

It should be noted that the above computer readable medium in the present disclosure can be a computer readable signal medium or a computer readable storage medium or a combination of the two. The computer readable storage medium can be, for example, but not limited to, an electrical, a magnetic, an optical, an electromagnetic, an infrared, or a semiconductor system, apparatus, or device, or any combination of the above. More specific examples of the computer readable storage medium may include, but are not limited to: an electrical connection having one or more wires, a portable computer disk, a hard disk, a random access memory (RAM), a read only memory (ROM), an electrical programmable read only memory (EPROM or a flash memory), an optical fiber, a portable compact disc read only memory (CD-ROM), an optical storage device, a magnetic storage device, or any suitable combination of the above. In the present disclosure, the computer readable storage medium can be any tangible medium containing or storing a program, where the program can be used by or in connection with an instruction execution system, apparatus or device. And in the present disclosure, the computer readable signal medium may include a data signal propagated in baseband or as a part of a carrier wave in which computer readable program codes are carried. This propagated data signal can adopt various manners, including but not limited to an electromagnetic signal, an optical signal or any suitable combination of the above. The computer readable signal medium can also be any computer readable medium other than a computer readable storage medium, and the computer readable signal medium can send, propagate or transmit a program for use by or in connection with an instruction execution system, apparatus or device. The program codes contained on the computer readable medium can be transmitted by any suitable medium including but not limited to: an electric wire, an optical cable, RF (Radio Frequency), etc., or any suitable combination of the above.

The above computer readable medium may be contained in the above electronic device; or may exist separately instead of being assembled into the electronic device.

The above computer readable medium carries one or more programs, and the one or more programs, when executed by the electronic device, cause the electronic device to execute the methods shown in the above embodiments.

The computer program codes for executing the operations of the present disclosure can be written in one or more programming languages or a combination thereof, where the above programming languages include object-oriented programming languages such as Java, Smalltalk, C++, and also conventional procedural programming languages such as "C" language or similar programming languages. The program codes can be completely executed on the user computer, partially executed on the user computer, executed as an independent software package, partially executed on the user computer and partially executed on a remote computer, or completely executed on a remote computer or a server. In case of involving a remote computer, the remote computer can be connected to the user computer through any kind of networks, including a local area network (LAN for short) or a wide area network (WAN for short), or can be connected to an external computer (for example, by using Internet service providers to connect through the Internet).

The flow charts and block diagrams in the drawings illustrate the architecture, functions and operations of possible implementations of systems, methods and computer program products according to various embodiments of the present disclosure. In this regard, each block in the flow charts or block diagrams may represent a module, a program segment, or a part of codes, where the module, the program segment, or the part of codes contains one or more executable instructions for implementing specified logical functions. It should also be noted that in some alternative implementations, the functions marked in the blocks may also occur in an order different from those marked in the drawings. For example, two blocks represented in succession may actually be executed in substantially parallel, or they may sometimes be executed in a reverse order, which depends on the functions involved. It should also be noted that each block in the block diagrams and/or flow charts, and combinations of blocks in the block diagrams and/or flow charts, can be implemented with a dedicated hardware-based system that performs specified functions or operations, or can be implemented with combinations of dedicated hardware and computer instructions.

An involved unit described in the embodiments of the present disclosure can be implemented by software or hardware. Where a name of the unit does not constitute a limitation on the unit itself in some cases. For example, a first acquiring unit can also be described as "a unit for acquiring at least two Internet protocol addresses".

The functions described above herein may be performed at least in part by one or more hardware logic components. For example, without limitation, exemplary types of hardware logic components that can be used include a field programmable gate array (FPGA), an application specific integrated circuit (ASIC), an application specific standard product (ASSP), a system on chip (SOC), a complex programmable logic device (CPLD), etc.

In the context of the present disclosure, the machine readable medium may be a tangible medium that may contain or store a program for use by or in connection with an instruction execution system, apparatus or device. The machine readable medium may be a machine readable signal medium or a machine readable storage medium. The machine readable medium may include, but is not limited to, an electronic, a magnetic, an optical, an electromagnetic, an infrared, or a semiconductor system, apparatus, or device, or any suitable combination of the above contents. More specific examples of the machine readable storage medium may include an electrical connection based on one or more wires, a portable computer disk, a hard disk, a random access memory (RAM), a read only memory (ROM), an electrical programmable read only memory (EPROM or a flash memory), an optical fiber, a portable compact disc read only memory (CD-ROM), an optical storage device, a magnetic storage device, or any suitable combination of the above contents.

An embodiment of the present disclosure further provides a computer program, where the computer program is used for implementing the method for recommending a podcast in a music application as described above.

The embodiment of the present disclosure further provides a computer readable storage medium, where the computer readable storage medium stores computer executable instructions, when executed by a processor, cause a computing device to implement the method for recommending a podcast in a music application as described above as shown in the FIG. 2 or FIG. 4.

An embodiment of the present disclosure further provides a computer program product, where the computer program product includes a computer program that, and the method for recommending a podcast in a music application as described above is implemented when the computer program is executed by a processor.

An embodiment of the present disclosure further provides a system for podcast recommendation in a music application, where the system may include the terminal device and the server as described above.

In a first example of the first aspect, an embodiment of the present disclosure provides a method for recommending a podcast in a music application, which is applied to a terminal device and includes:

receiving a start instruction for a podcast interface in the music application; and displaying, in response to the start instruction, a first preset number of recommended podcast programs in the podcast interface, where each of the recommended podcast programs is an episode of audio data, and the recommended podcast programs include a podcast program matching with a preference of a user who uses the music application.

Based on the first example of the first aspect, in a second example of the first aspect, the podcast program matching with the preference of the user who uses the music application include at least one of the following: a podcast program matching with logged preference information of the user, and a podcast program matching with a first podcast program, where the first podcast program is generated according to an historical operation of the user.

Based on the second example of the first aspect, in a third example of the first aspect, before displaying the first preset number of recommended podcast programs in the podcast interface, the method further includes:

acquiring, according to the preference information of the user, the recommended podcast programs, if a number of times that the podcast interface is started is less than or equal to a preset number.

Based on the third example of the first aspect, in a fourth example of the first aspect, before acquiring, according to the preference information of the user, the recommended podcast programs, the method further includes:

displaying a preference logging interface; and receiving the preference information of the user inputted by the user in the preference logging interface.

Based on the fourth example of the first aspect, in a fifth example of the first aspect, the displaying the preference logging interface includes:

displaying a first prompt information; and displaying, in response to a confirmation instruction of the user for the first prompt information, the preference logging interface.

Based on the second example of the first aspect, in a sixth example of the first aspect, before displaying the first preset number of recommended podcast programs in the podcast interface, the method further includes:

acquiring, according to a user identification of the user, the recommended podcast programs, if the number of times that the podcast interface is started is greater than the preset number of times and a duration between a current time and a last update time is greater than or equal to a first preset duration, where the last update time is a time when the recommended podcast programs are acquired last time.

Based on the second example of the first aspect, in a seventh example of the first aspect, before displaying the first preset number of recommended podcast programs in the podcast interface, the method further includes:

acquiring the recommended podcast programs acquired last time from the terminal device, if the number of times that the podcast interface is started is greater than the preset number of times and a duration between the current time and the last update time is less than a first preset duration.

Based on any one of the first to seventh examples of the first aspect, in an eighth example of the first aspect, the recommended podcast programs include at least one of following: podcast programs that are not displayed in the podcast interface in a first current time period and podcast programs that are not finished to be played in a second current time period, where a duration of the first current time period is shorter than a duration of the second current time period.

Based on any one of the first to seventh examples of the first aspect, in a ninth example of the first aspect, the receiving the start instruction for the podcast interface in the music application includes:

receiving an operation instruction for a target control in a navigation bar of the music application, where the target control is configured to start the podcast interface.

Based on any one of the first to seventh examples of the first aspect, in a tenth example of the first aspect, the method further includes:

receiving a first operation instruction of the user for an episode of target podcast program; and playing, in response to the first operation instruction, the target podcast program.

Based on any one of the first to seventh examples of the first aspect, in an eleventh example of the first aspect, the method further includes:

receiving a second operation instruction of the user for an episode of target podcast program; and displaying detailed information of the target podcast program in response to the second operation instruction.

Based on any one of the first to seventh examples of the first aspect, in a twelfth example of the first aspect, the method further includes:

displaying, in response to the start instruction, basic information of a podcast program that has been played by the user is displayed in the podcast interface, where the basic information includes at least one of the following items: cover information, title, description information, and duration.

Based on any one of the first to seventh examples of the first aspect, in a thirteenth example of the first aspect, the displaying the first preset number of recommended podcast programs in the podcast interface includes:

displaying basic information of the first preset number of recommended podcast programs in the podcast interface, where the basic information includes at least one of the following items: cover information, title, description information, and duration.

In a first example of the second aspect, a method for recommending a podcast in a music application is provided, which is applied to a server and includes:

receiving a podcast recommendation request;

acquiring podcast programs matching with preference information of a user as recommended podcast programs when the podcast recommendation request includes the preference information of the user; and taking podcast programs related to a first podcast program as the recommended podcast programs when the podcast recommendation request includes an identification of a user and there is the first podcast program historically operated by the user corresponding to the identification of the user.

Based on the first example of the second aspect, in a second example of the second aspect, the method further includes:

acquiring, according a preset parameter, the recommended podcast programs when the podcast recommendation request includes the identification of the user and there is no the first podcast program historically operated by the user corresponding to the identification of the user, where the preset parameter includes at least one of the following: historical recommendation frequency and historical searching frequency.

Based on the first or second example of the second aspect, in a third example of the second aspect, the recommended podcast programs meet at least one of the following conditions: the recommended podcast programs meet a compliance condition, durations of the recommended podcast programs are greater than or equal to a second preset duration, basic information of the recommended podcast programs is not empty, a number of recommended podcast programs belonging to a same genre of podcasts is less than or equal to a second preset number, the number of recommended podcast programs belonging to the same genre of podcasts in a third current time period is less than or equal to the second preset number, and the recommended podcast programs are podcast programs that are not recommended in a fourth current time period, where basic information of the recommended podcast programs includes: cover information, title, description information, and duration.

In a first example of the third aspect, a terminal device is provided, which includes:

a start instruction receiving module, configured to receive a start instruction for a podcast interface in the music application; and a recommended podcast display module, configured to display a first preset number of recommended podcast programs in the podcast interface in response to the start instruction, where each of the recommended podcast programs is an episode of audio data, and the recommended podcast programs include a podcast program matching with a preference of a user who uses the music application.

In a first example of the third aspect, a server is provided, which includes:

a podcast recommendation request receiving module, configured to receive a podcast recommendation request;

a first recommended podcast determination module, configured to acquire podcast programs matching with preference information of a user as recommended podcast programs when the podcast recommendation request includes the preference information of the user; and a second recommended podcast determination module, configured to take podcast programs related to a first podcast program as the recommended podcast programs when the podcast recommendation request includes an identification of a user and there is the first podcast program historically operated by the user corresponding to the identification of the user.

In a fifth aspect, according to one or more embodiments of the present disclosure, a terminal device is provided, which includes: at least one processor and a memory;

where the memory stores computer executable instructions; and the at least one processor executes the computer executable instructions stored in the memory to cause the terminal device to implement the method according to any one item of the first aspect.

In a sixth aspect, according to one or more embodiments of the present disclosure, a server is provided, which includes: at least one processor and a memory;

where the memory stores computer executable instructions; and the at least one processor executes the computer executable instructions stored in the memory to cause the server to implement the method according to any one item of the second aspect.

In a seventh aspect, according to one or more embodiments of the present disclosure, a system for recommending a podcast in a music application is provided, which includes: the terminal device according to the third aspect or the fifth aspect and the server according to the fourth aspect or the sixth aspect.

In an eighth aspect, according to one or more embodiments of the present disclosure, a computer readable storage medium is provided, where the computer readable storage medium stores computer executable instructions, the method as described in the first or second aspect above is implemented when the computer executable instructions are executed by a processor.

In a ninth aspect, according to one or more embodiments of the present disclosure, a computer program is provided, where the computer program is used for implementing the method as described in the first aspect or the second aspect above.

In a tenth aspect, according to one or more embodiments of the present disclosure, a computer program product is provided, where the computer program product includes a computer program, and the method as described in the first or second aspect above is implemented when the computer program is executed by a processor.

The above description is only a description of preferred embodiments of the present disclosure and applied technical principles. It should be understood by those skilled in the art that the disclosure scope involved in the present disclosure is not limited to the technical solution formed by the specific combination of the above technical features, but also covers other technical solutions formed by any combination of the above technical features or equivalent features thereof without departing from the above disclosure concept. For example, the technical solution formed by replacing the above features with the technical features with similar functions disclosed in (but not limited to) the present disclosure.

In addition, although the operations are depicted in a particular order, this should not be understood as requiring that the operations are performed in the particular order shown or in a sequential order. Under certain circumstances, multitasking and parallel processing may be advantageous. Similarly, although several specific implementation details are included in the above discussion, these should not be interpreted as limitations on the scope of the present disclosure. Certain features described in the context of separate embodiment may also be implemented in a single embodiment in combination. On the contrary, various features described in the context of a single embodiment can also be implemented in multiple embodiments individually or in any suitable sub-combination.

Although the subject matter has been described in language specific to structural features and/or logical acts of methods, it should be understood that the subject matter defined in the appended claims is not necessarily limited to the specific features or acts described above. On the contrary, the specific features and actions described above are merely exemplary forms for implementing the claims.

What is claimed is:

1. A method for recommending a podcast in a music application, applied to a terminal device, the method comprising:

receiving a start instruction for a podcast interface in the music application; and displaying, in response to the start instruction, a first preset number of recommended podcast programs in the podcast interface, wherein each of the recommended podcast programs is an episode of audio data, and the recommended podcast programs comprise a podcast program matching with a preference of a user who uses the music application;

wherein the podcast program matching with the preference of the user who uses the music application comprise at least one of the following: a podcast program matching with logged preference information of the user, and a podcast program matching with a first podcast program, wherein the first podcast program is generated according to an historical operation of the user; and before displaying the first preset number of recommended podcast programs in the podcast interface, the method further comprises:

acquiring, according to a user identification of the user, the recommended podcast programs from historical behavior record as the first podcast program historically operated by the user, if a number of times that the podcast interface is started is greater than the preset number of times and a duration between a current time and a last update time is greater than or equal to a first preset duration, wherein the last up date time is a time when the recommended podcast programs are acquired last time; or acquiring the recommended podcast programs acquired last time from the terminal device, if the number of times that the podcast interface is started is greater than the preset number of times and the duration between the current time and the last update time is less than the first preset duration.

2. The method according to claim 1, before displaying the first preset number of recommended podcast programs in the podcast interface, further comprising:
   acquiring, according to the preference information of the user, the recommended podcast programs, if a number of times that the podcast interface is started is less than or equal to the preset number of times.

3. The method according to claim 2, before acquiring, according to the preference information of the user, the recommended podcast programs, further comprising:
   displaying a preference logging interface; and
   receiving the preference information of the user inputted by the user in the preference logging interface.

4. The method according to claim 3, wherein the displaying a preference logging interface comprises:
   displaying first prompt information; and
   displaying, in response to a confirmation instruction of the user for the first prompt information, the preference logging interface.

5. The method according to claim 1, wherein the recommended podcast programs comprise at least one of following: podcast programs that are not displayed in the podcast interface in a first current time period and podcast programs that are not finished to be played in a second current time period, wherein a duration of the first current time period is shorter than a duration of the second current time period.

6. The method according to claim 1, wherein receiving the start instruction for the podcast interface in the music application comprises:
   receiving an operation instruction for a target control in a navigation bar of the music application, wherein the target control is configured to start the podcast interface.

7. The method according to claim 1, wherein the method further comprises:
   receiving a first operation instruction of the user for an episode of target podcast program; and
   playing, in response to the first operation instruction, the target podcast program.

8. The method according to claim 1, wherein the method further comprises:
   receiving a second operation instruction of the user for an episode of target podcast program; and
   displaying, in response to the second operation instruction, detailed information of the target podcast program.

9. The method according to claim 1, wherein the method further comprises:
   displaying, in response to the start instruction, basic information of a podcast program that has been played by the user is displayed in the podcast interface, wherein the basic information comprises at least one of the following items: cover information, title, description information, and duration.

10. A terminal device, comprising:
    at least one processor and a memory;
    wherein the memory stores computer executable instructions; and
    the at least one processor executes the computer executable instructions stored in the memory to cause the terminal device to implement the method according to claim 1.

11. A non-transitory computer readable storage medium, wherein the non-transitory computer readable storage medium stores computer executable instructions that, when executed by a processor, causes a computing device to implement the method according to claim 1.

* * * * *